United States Patent
Wheeler et al.

(10) Patent No.: US 6,792,733 B2
(45) Date of Patent: Sep. 21, 2004

(54) DEFLECTION CLIP

(75) Inventors: Frank Wheeler, Oklahoma City, OK (US); Dick Ninness, Shawnee, OK (US)

(73) Assignee: Flex-Ability Concepts, L.L.C., Edmond, OK (US)

( * ) Notice: Subject to any disclaimer, the term of this patent is extended or adjusted under 35 U.S.C. 154(b) by 0 days.

(21) Appl. No.: 09/978,477

(22) Filed: Oct. 16, 2001

(65) Prior Publication Data

US 2002/0170260 A1 Nov. 21, 2002

Related U.S. Application Data

(60) Provisional application No. 60/291,490, filed on May 16, 2001.

(51) Int. Cl.[7] .................................................. E04C 2/38
(52) U.S. Cl. ..................... 52/656.1; 52/712; 52/714; 52/715; 52/241; 52/690; 52/481.1
(58) Field of Search .............................. 52/656.1, 712, 52/714, 715, 241, 690, 481.1

(56) References Cited

U.S. PATENT DOCUMENTS

| | | | |
|---|---|---|---|
| 3,730,486 A | * | 5/1973 | Swanquist ............... 248/216.4 |
| 4,121,391 A | | 10/1978 | Schroeder |
| 4,433,524 A | | 2/1984 | Matson |
| 4,481,749 A | | 11/1984 | Stirling |
| 5,040,345 A | | 8/1991 | Gilmour |
| 5,127,203 A | | 7/1992 | Paquette |
| 5,127,760 A | | 7/1992 | Brady |
| 5,152,117 A | * | 10/1992 | Wynar ........................ 52/712 |
| 5,216,858 A | | 6/1993 | Gilmour |
| 5,224,322 A | | 7/1993 | van den Toorn |
| 5,291,717 A | | 3/1994 | Turner |
| 5,394,665 A | | 3/1995 | Johnson |
| 5,519,976 A | * | 5/1996 | Gee ........................... 52/712 |
| 5,640,823 A | | 6/1997 | Bergeron et al. |
| 5,720,571 A | | 2/1998 | Frobosilo et al. |
| 5,836,133 A | | 11/1998 | Bergeron et al. |
| 5,904,023 A | | 5/1999 | diGirolamo et al. |
| 5,966,893 A | * | 10/1999 | Quillin ....................... 52/713 |
| 6,000,181 A | | 12/1999 | Wheeler |
| 6,088,982 A | | 7/2000 | Hiesberger |

* cited by examiner

*Primary Examiner*—Carl D. Friedman
*Assistant Examiner*—Steve Varner
(74) *Attorney, Agent, or Firm*—Fellers, Snider, et al.

(57) ABSTRACT

A deflection clip comprising a planar base plate comprising a first surface and an opposing second surface, and a guide depending from the base plate. The guide comprises a first arm extending along a longitudinal axis substantially transverse to the base plate from a proximal end adjacent the second surface. The guide further comprises a second arm extending away from the base plate oriented in the same direction as the first arm defining a channel between the arms.

20 Claims, 9 Drawing Sheets

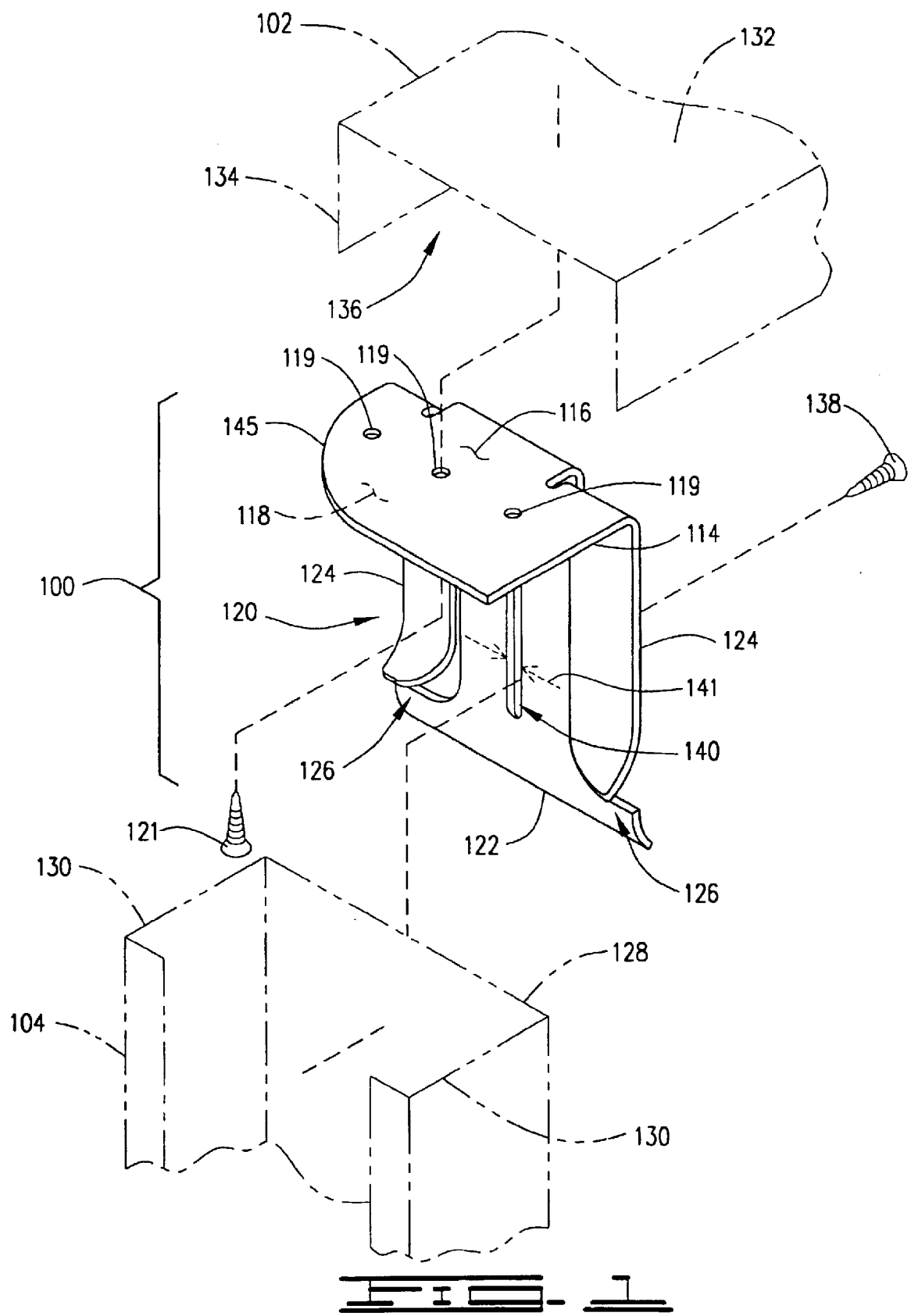

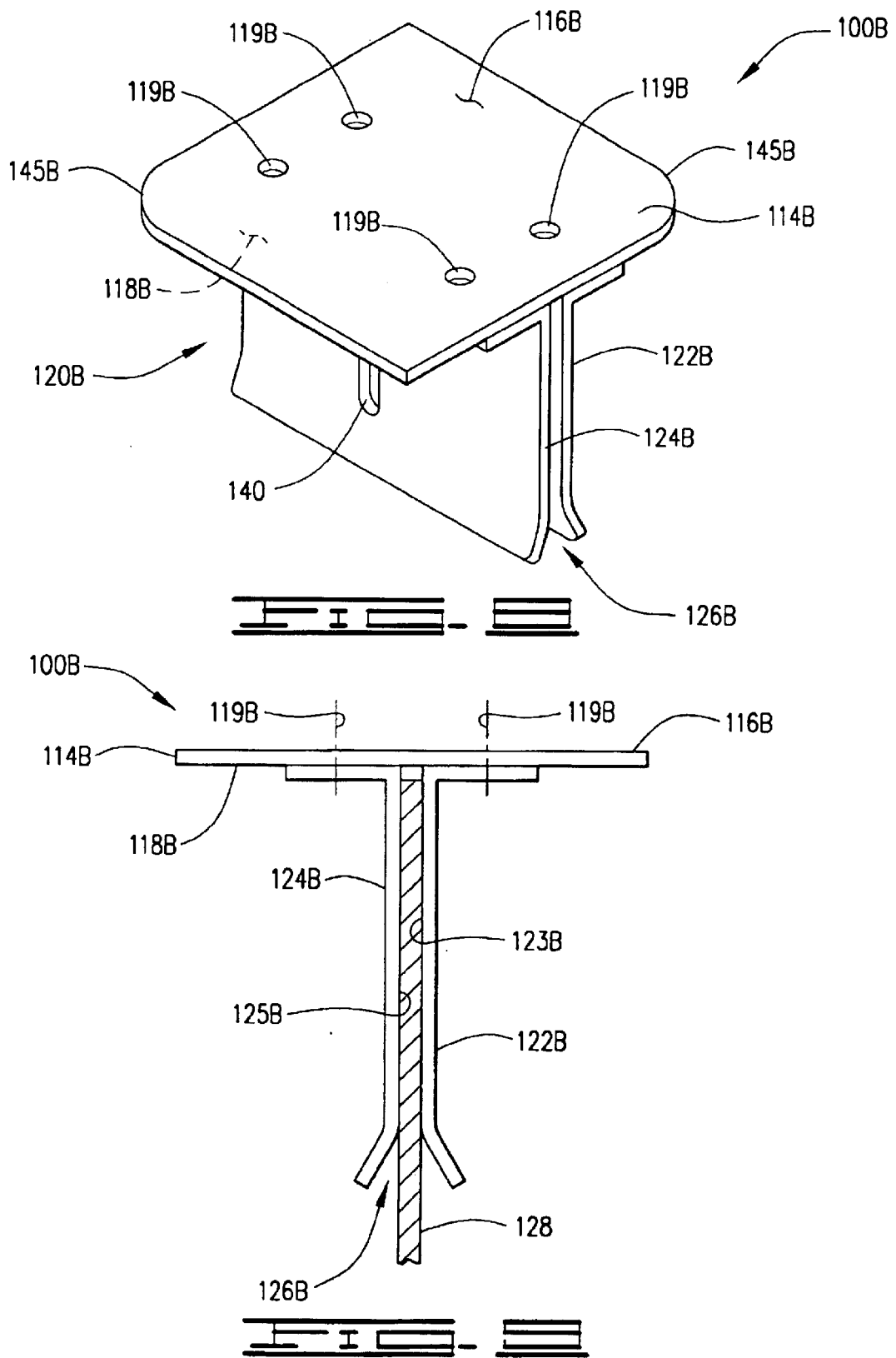

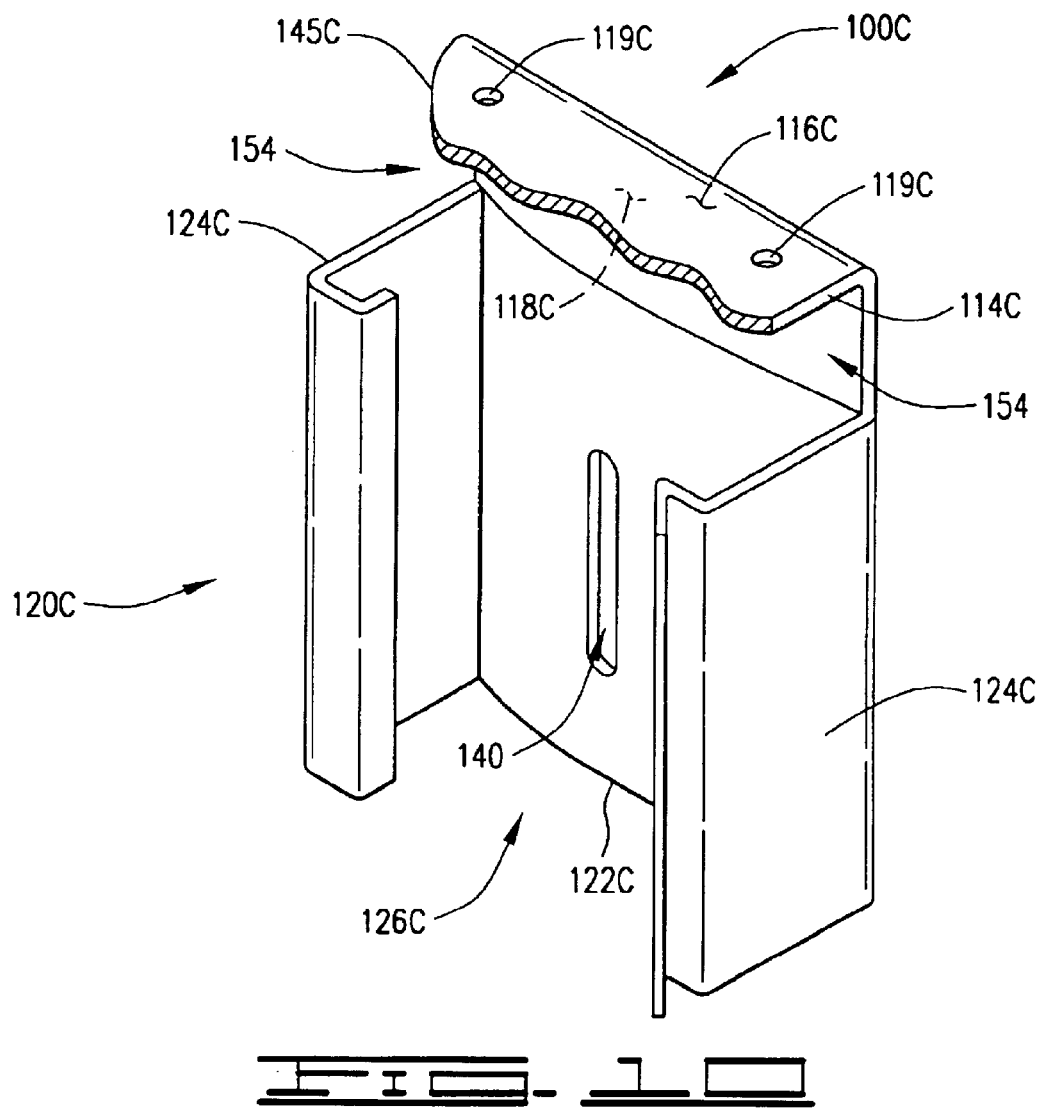
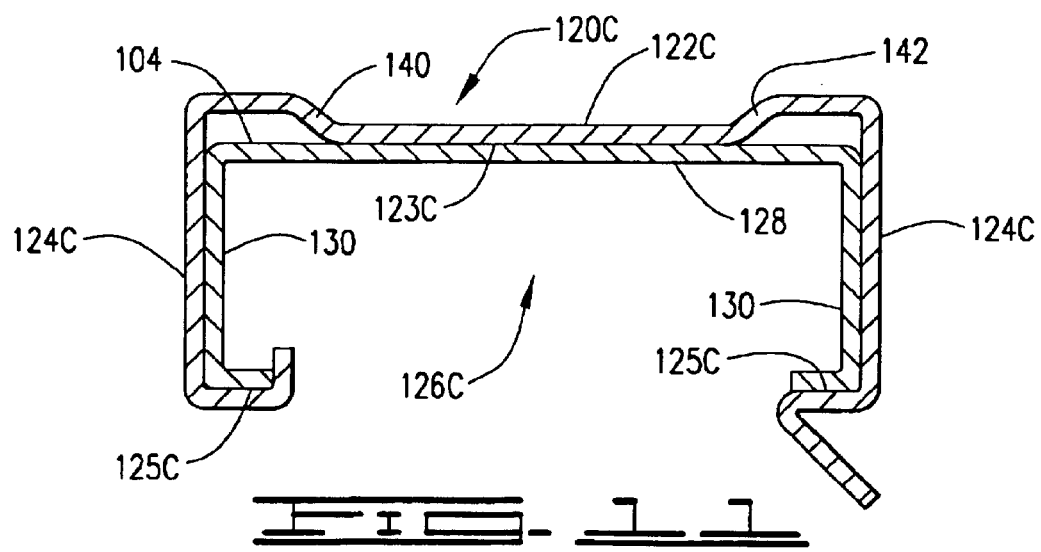

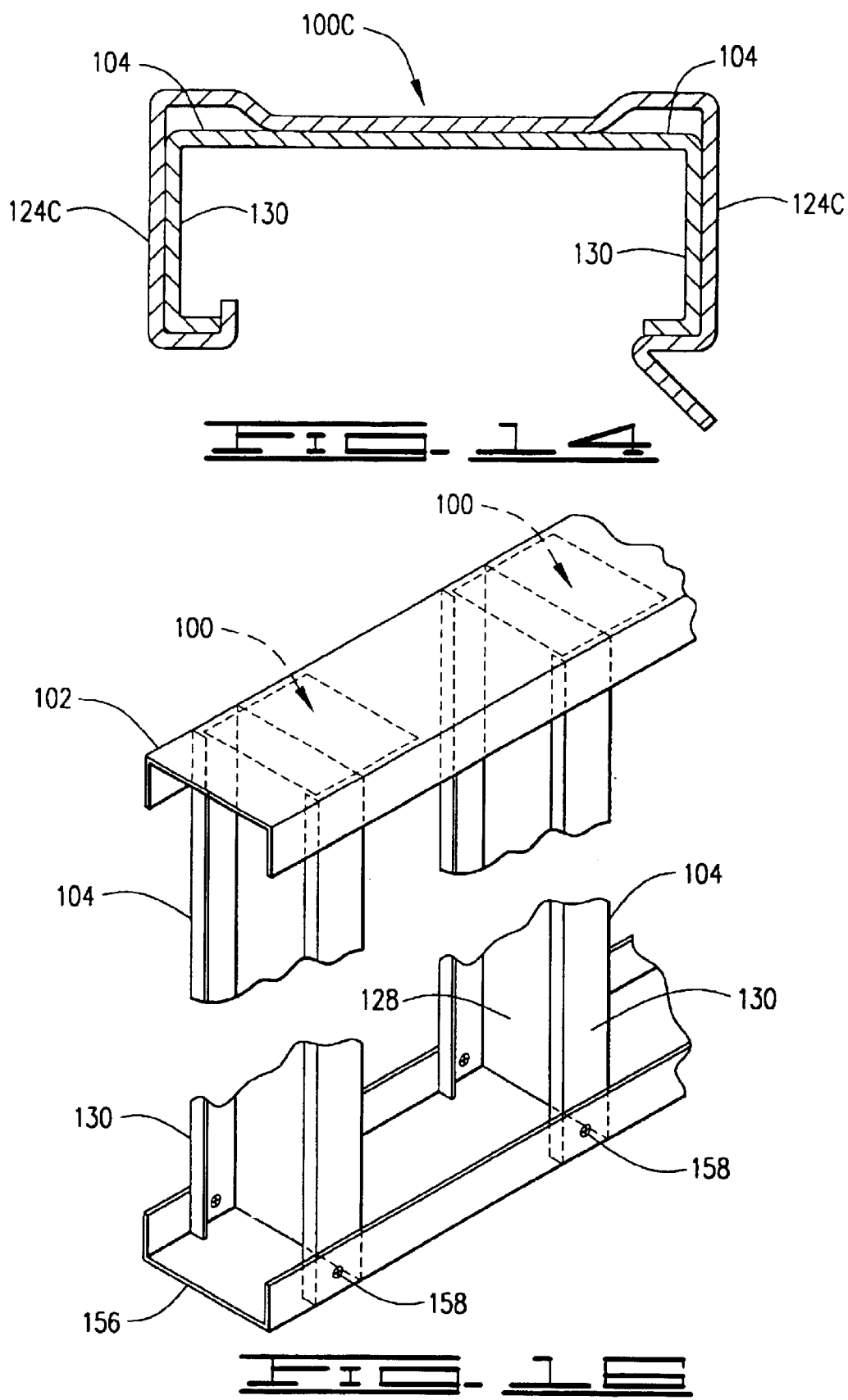

DEFLECTION CLIP

CROSS REFERENCE TO RELATED APPLICATIONS

This application claims the benefit of U.S. Provisional Application Number 60/291,490, filed May 16, 2001.

FIELD OF THE INVENTION

This invention relates generally to the field of wall framing assemblies and more particularly, but without limitation, to an apparatus and associated method for operatively connecting framing members in a slip joint.

BACKGROUND OF THE INVENTION

In constructing buildings with metal framing members it is well known in the art to utilize slip-type connector devices to flexibly connect horizontal beam members with vertical stud members. Such connector devices are commonly used to form expandable joints commonly referred to as "slip joints." Slip joints are particularly useful in the framing of partition walls which, if otherwise constructed rigidly, can be subjected to adverse compressive and tensile forces by loads acting on the building floors and roof. These forces can lead to problems associated with cracking and bowing of the coverings that are attached on the framing members. The slip joint solves the problem by permitting deflection of framing members at the joint; that is, by permitting the framing members to displace relative to each other under loading at the joint.

Loads of concern can be categorically, for example, live loads, dead loads, seismic loads and wind loads and any other loads acting on the building including but not limited to foot traffic, slab heaving, environmental loading (snow and wind load), and thermal expansion. Although the floors and the roof must be designed to withstand these loads, the partition walls are preferably isolated from them, in part by the slip joints.

The capability of a slip joint connector depends on maintaining a sliding engagement relationship between the connected framing members during deflection. This sliding engagement must be preserved throughout the wall's expected life span. It is essential that the slip joint permit the desired freedom of movement without binding, which can render the slip joint useless.

It has been found that significantly improved slip joint performance is achieved by employing a slip connector characteristic of the type involving a clip that rigidly fixes at one end to the horizontal member and that has an extending guide defining a channel that receivingly engages the vertical member medial web portion in a characteristic sliding relationship. Slidingly supporting the web portion of the vertical framing member substantially reduces the torsion imparted to the framing members during deflection. Torsion is further reduced by attaching the clip fixed end with forces acting substantially parallel with the channel.

A positive engagement can be achieved by narrowing the channel so that bearing surfaces in the guide compressingly slidingly engage against the vertical member with a desired frictional resistance to the operative sliding engagement. This compressing engagement feature provides a slip joint assembly that is comparatively easier to use because, for example, the clip is self-aligning with the framing members, and the clip is self-retaining during subsequent construction of the wall assembly. It is to these improvements and other features and advantages apparent from the description and appended claims that embodiments of the present invention are directed.

SUMMARY OF THE INVENTION

Embodiments of the present invention are directed to a slip joint connector device involving a deflection clip comprising a planar base plate comprising a first surface and an opposing second surface, and the clip further comprising a guide depending from the base plate. The guide comprises a first arm extending along a longitudinal axis substantially transverse to the base plate from a proximal end adjacent the second surface. The guide further comprises a second arm extending away from the base plate oriented in the same direction as the first arm defining a channel between the arms.

The clip operatively connects a first member to a second member in a slip joint, the second member comprising a medial web and one or more outer flanges. The base is connectable to the first member and the guide depends from the base such that the channel receivingly engages the second member web in a characteristic operative sliding relationship. In one embodiment the opposing arms are selectively spatially disposed to operatively compressingly engage the second member web with a selected frictional resistance to the operative sliding engagement. In one embodiment the guide defines an opening in at least one of the arms adapted for admitting a retainer limiting the extents of displacement between the members. The retainer prevents the members from being pulled apart even under extreme loading.

Another aspect of the present invention includes a wall framing assembly comprising a first track, a second track substantially aligned and spatially disposed from the first track, and a plurality of studs interposed between the tracks, each stud comprising a longitudinal extending medial web portion and one or more longitudinal extending stiffening flanges between a first end and a second end of the stud. A clip operatively connects a selected stud's first end to the first track in a slip joint, the clip comprising a base fixed to the first track, and a guide depending from the base comprising opposing arms defining a channel receivingly engaging the selected stud's web in a characteristic operative sliding relationship, and a fastener connecting the selected stud's second end to the second track. The clip base has a planar first surface and an opposing second surface, and the guide opposing arms comprise a first arm extending along a longitudinal axis substantially transverse to the base from a proximal end adjacent the second surface, and a second arm extending away from the base oriented in the same direction as the first arm. In one embodiment the arms are selectively spatially disposed to operatively engage the second member web with a selected frictional resistance to the operative sliding engagement.

Another aspect of the present invention includes a method of framing a wall structure, comprising providing a first track, providing a second track substantially aligned and spatially disposed from the first track, providing a plurality of studs interposed between the tracks, each stud characterized by a longitudinal extending medial web portion and one or more longitudinal extending stiffening flanges between ends of the stud, and providing a clip for operatively connecting a selected stud's first end to the first track in a slip joint. The clip comprises a base fixable to the first track, and a guide depending from the base comprising opposing arms defining a channel receivingly engageable with the selected stud's web in a characteristic operative sliding relationship. A method further comprises engaging the selected stud's first end with the clip, connecting the clip to the first track with a fastener, and connecting the selected stud's second end to the second track with a fastener.

These and various other features as well as advantages which characterize embodiments of the present invention will be apparent upon a reading of the following detailed description and review of the associated drawings.

BRIEF DESCRIPTION OF THE DRAWINGS

FIG. 1 is an exploded isometric view of a portion of a wall framing assembly comprising a deflection clip constructed in accordance with an embodiment of the present invention for joining framing assembly members in a slip joint;

FIG. 8 is an isometric view of a deflection clip constructed in accordance with an alternative embodiment of the present invention.

FIG. 9 is an elevational view of the deflection clip of FIG. 8.

FIG. 10 is an isometric view of a deflection clip constructed in accordance with an alternative embodiment of the present invention.

FIG. 11 is a cross sectional view of the guide portion of the deflection clip of FIG. 10 operatively slidingly engaging the vertical framing member.

FIGS. 13 and 14 diagrammatically illustrate a snap-on method of operatively attaching the deflection clip of FIG. 10 to the vertical framing member.

FIG. 16 is a diagrammatic isometric view of a portion of a wall framing assembly constructed in accordance with embodiments of the present invention.

DETAILED DESCRIPTION

Figure 1A:
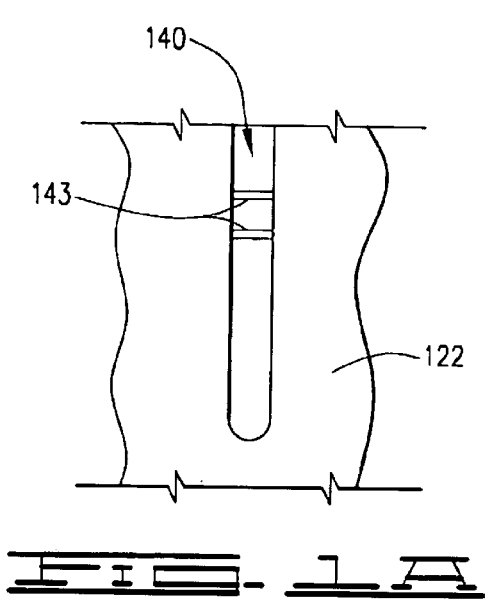
FIG. 1A is an enlarged detail view of a portion of the clip of FIG. 1.

Turning now to the drawings in general and more particularly to FIG. 1 which is an isometric view of a deflection clip 100 (or "clip" 100) constructed in accordance with an embodiment of the present invention for operatively joining a first framing member 102 (sometimes referred to as "track") and a second framing member 104 (sometimes referred to as "stud") in a slip joint. The members 102, 104 form a portion of a wall framing assembly. "Slip joint," for purposes of this description, means that the members 102, 104 are joined so as to permit a controlled displacement of one of the members relative to the other member under loading. This relative displacement allows deflection in the wall assembly under loading to prevent damage.

Generally, a clip constructed in accordance with embodiments of the present invention, such as clip 100, has a proximal end fixed to the first member 102 and a distal end receivingly engaging the second member 104 in a characteristic operative sliding engagement. The framing members 102, 104 in FIG. 1 are illustratively disposed substantially horizontally and vertically, respectively. In this arrangement, the desired deflection typically occurs along the second member 104 longitudinal axis. Namely, this means the horizontal member has freedom of movement in a direction substantially along the vertical member longitudinal axis. This example is illustrative and not limiting, as equivalent embodiments are contemplated that operatively join framing members in a slip joint at other desired orientations. An enumeration of all possible framing member orientations is not necessary for an understanding of the embodiments of the present invention.

Although the first member 102 in FIG. 1 is a conventional u-channel, embodiments of the present invention can be used with other conventional structural members, such as a c-channel or a z-channel. Similarly, although the second member 104 in FIG. 1 is a conventional c-channel, embodiments of the present invention can be used with other conventional structural members, such as a u-channel or a z-channel.

Turning now to focus more particularly on the clip 100, which comprises a planar base plate 114 comprising a first surface 116 and an opposing second surface 118. The base plate 114 is adapted for fixed attachment to the first member 102, such as by apertures 119 for accepting fasteners such as self-drilling screw member 121. A guide 120 depends from the base plate 114 comprising a first arm 122 extending from a proximal end adjacent the second surface 118. The guide 120 furthermore comprises one or more second arms 124 extending away from the base plate 114 oriented in the same direction as the first arm 122, defining a channel 126 therebetween. Although not explicitly shown, it will be understood that conventional strengthening features such as gussets and ribs can be incorporated into portions of the clip 100 as needed, and more particularly to strengthen the arms 122, 124.

Figure 2:
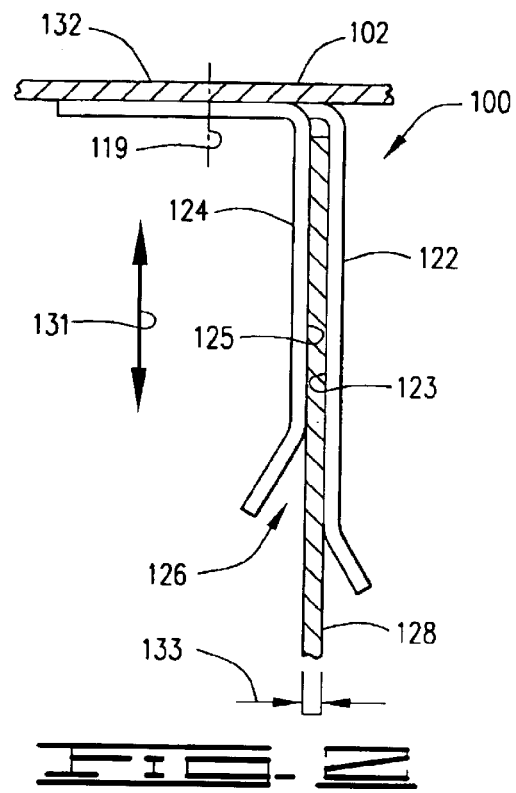
FIG. 2 is an elevational view of the deflection clip of FIG. 1 operatively slidingly engaging the vertical framing member web during deflection between the framing assembly members.

The second member 104 in the example of FIG. 1 has a medial web portion 128 and stiffening flanges 130. FIG. 2 better illustrates the manner in which the channel 126 receivingly engages the web 128 in a characteristic operative sliding relationship. Namely, assuming a stationary clip 100, the second member 104 has freedom of movement in a direction along its longitudinal axis, denoted by the reference number 131 in FIG. 2, as the web 128 is slidingly constrained within the channel 126. The web 128 slidingly engages bearing surfaces 123, 125, respectively, of the arms 122, 124. Lateral movement is prevented by the sandwiching support of the opposing arms 122, 124.

Figure 3:
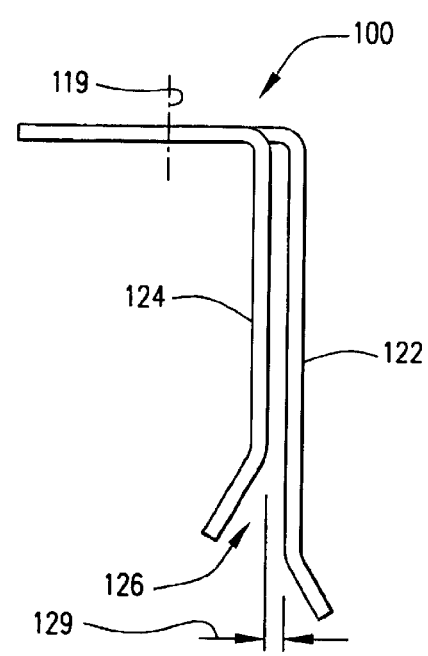
FIG. 3 is an elevational view of only the deflection clip of FIG. 1.

FIG. 3 is an elevational view of the clip 100 of FIG. 1 with the web 128 omitted to better illustrate the channel 126. The opposing arms 122, 124 can be selectively spatially disposed to define the width 129 of the channel 126. By selectively setting the width 129 relative to the thickness 133 (FIG. 2)

of the web 128, a desired frictional resistance to the operative sliding engagement is achieved. This is, in one embodiment the width 129 is substantially the same or greater than the thickness 133 so that the web 128 is receivingly engaged within the channel 126. In an alternative embodiment the width is substantially less than the thickness 133, as in FIG. 4, so that the arms 122, 124 compressingly engage against the web 128, resulting in an operative positive engagement between the clip 100 and the second member 104.

This compressing engagement of one or more of the arms 122, 124 against the web 128 generally results in a relatively more robust slip joint. Additional benefits are provided as well, for example, in that compressing engagement makes it easier to construct the framing assembly. For example, the compressing engagement makes the clip 100 longitudinally self-aligning with the second member 104. Also, the compressing engagement temporarily retains the clip 100 to the second member 104 for a hands-free manipulation during subsequent alignment and attachment to the first member 102.

A retainer can be provided to selectively limit displacement of the clip 100 relative to the second member 104 during displacement. For example, in FIG. 1 a screw 138 can pass through an opening 140 in one or both arms 122, 124 and engage the web 128. The opening 140 is preferably slotted and disposed parallel to the second member 104 longitudinal axis, thereby providing longitudinal freedom of movement to the clip 100 within selected limits of displacement. That is, at the desired limits of displacement the retainer will pressingly engage against the respective edge of the opening 140. In this manner, the framing members 102, 104 are less likely to be pulled apart even under extreme loading.

Where the retainer comprises a threaded fastener such as screw 138, it will be recognized that the fastener can be selectively threadingly attached so as to urge one or both arms 122, 124 against the web 128, imparting a desired frictional resistance to the sliding engagement, However, the fastener cannot be attached to an extent such as would bind the web 128 within the clip 100 and thereby vitiate the slip joint function.

Figure 4:
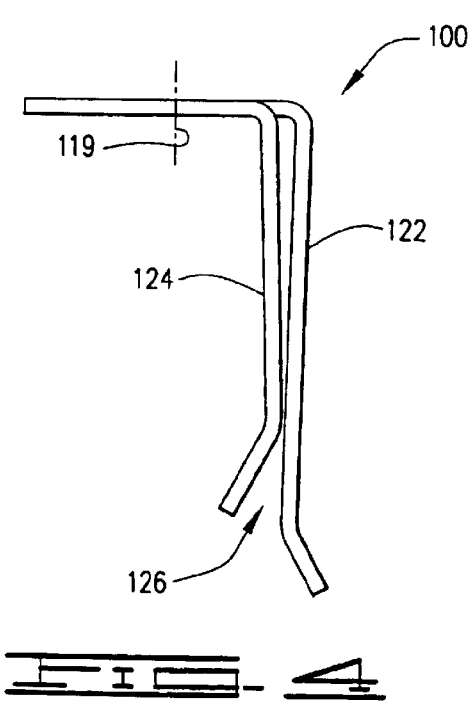
FIG. 4 is an elevational view of a deflection clip similar to FIG. 3 but constructed in accordance with an alternative embodiment of the present invention.

The arms 122, 124 of FIGS. 3 and 4 can be curved outwardly, away from the channel 126, at the distal ends thereof. This facilitates insertion of the web 128 into the channel 126. The arm 122 can be relatively longer for the same purpose. Also, although not shown, as mentioned above conventional stiffening structures such as detents and gussets can be employed to strengthen the arms 122, 124 and base 114 portions of the clip 100. Conventional surface finishing and/or lubricious coatings can be advantageous as well to enhance the operative sliding engagement.

Figure 5:
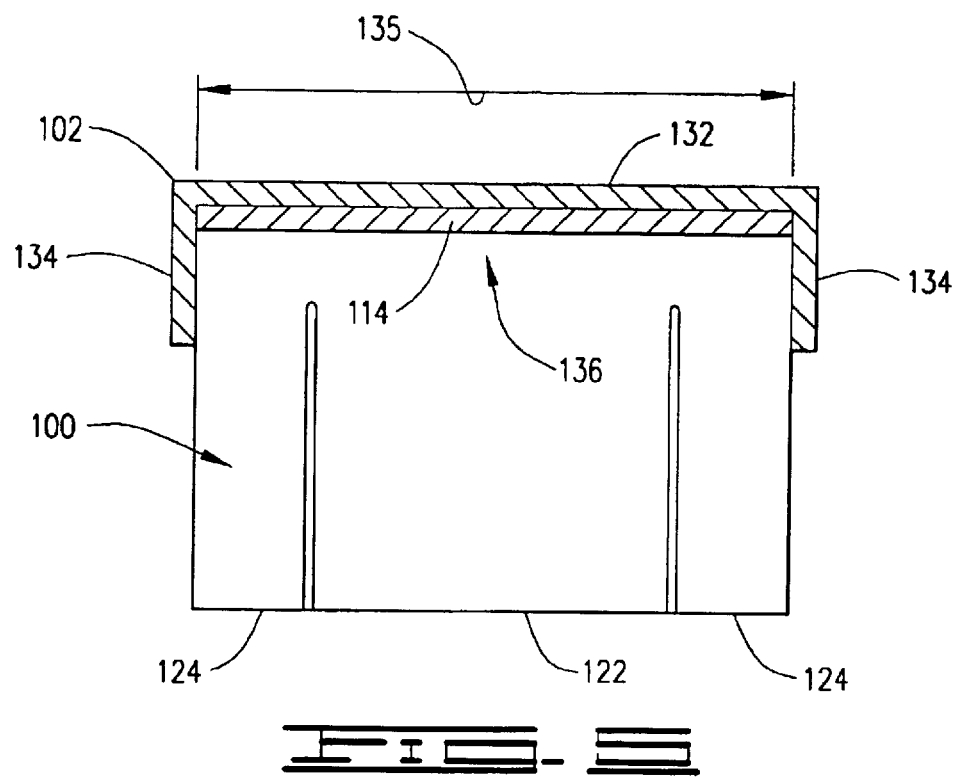
FIG. 5 is a cross sectional view of the deflection clip of FIG. 1 fixed at a proximal end to the horizontal framing member.

As described, the opposing arms 122, 124 support the second member 104 in a manner permitting a freedom of longitudinal movement while preventing lateral movement. As shown in FIG. 5, additional lateral support can be provided to the clip 100 by the first member 102. For example, the illustrative first member 102 is a u-shaped channel with a medial web 132 and stiffening flanges 134 defining a cavity 136 having a lateral depth 135. The base 114 and arms 122, 124 can be sized so as to substantially laterally span the depth 135 of the cavity 136, thereby utilizing the flanges 134 of the first member 102 to laterally support the clip 100.

An important characteristic feature of the embodiments of the present invention involve the manner that the clip 100 slidingly engages the vertical member web 128. This distributes forces during deflection across the longitudinal cross section of the vertical member 104, thereby minimizing moments imparted to the vertical member 104. This manner of sliding engagement also helps to maintain the relative orthogonal relationship of the joined framing members during deflection. These advantages minimize the likelihood of binding in the joint during deflection.

Moments can be further minimized by the manner that the clip 100 is fixed to the first member 102. From FIG. 2 it will be noted that the apertures 119, defining the placement of fasteners for attaching the clip 100 fixed end to the first member 102, preferably align the fasteners so that the attachment forces act substantially parallel with the channel 126. In the ideal case, the fastening forces are substantially coaxial with the bearing surfaces 123, 125. A certain amount of lateral offset is necessary, however, in order to provide sufficient clearance for a tool to install the fasteners. It will also be noted that in FIG. 1 the apertures 119 are preferably provided so that fasteners can anchor the clip 100 to the first member 102 at locations substantially aligned with the center of the arms 122, 124, to best counteract the loading forces transmitted during deflection.

A useful feature of the clip 100 is an indicia 141 shown in hidden lines which designates the nominal position for an operator to install the retainer, such as screw 138. The indicia can be a mark, such as the opposing arrows shown, imprinted, embossed or stamped, or the like, into the material. FIG. 1A is an enlarged detail view of a portion of the slotted opening 140 illustrating an alternative embodiment wherein the indicia comprises a pair of shaker tabs (or tearaway tabs) 143 that can be provided within the slotted opening 140 to designate the nominal position for the retainer. The shaker tabs 143 are broken away by the retainer during the first deflection, without impairing the sliding engagement function of the slip joint.

Another important advantage of the clip 100 of FIG. 1 is that it comprises a characteristic unitary construction; that is, it is formed out of a single piece of material. This can reduce cost by simplifying the component complexity.

Figure 6:
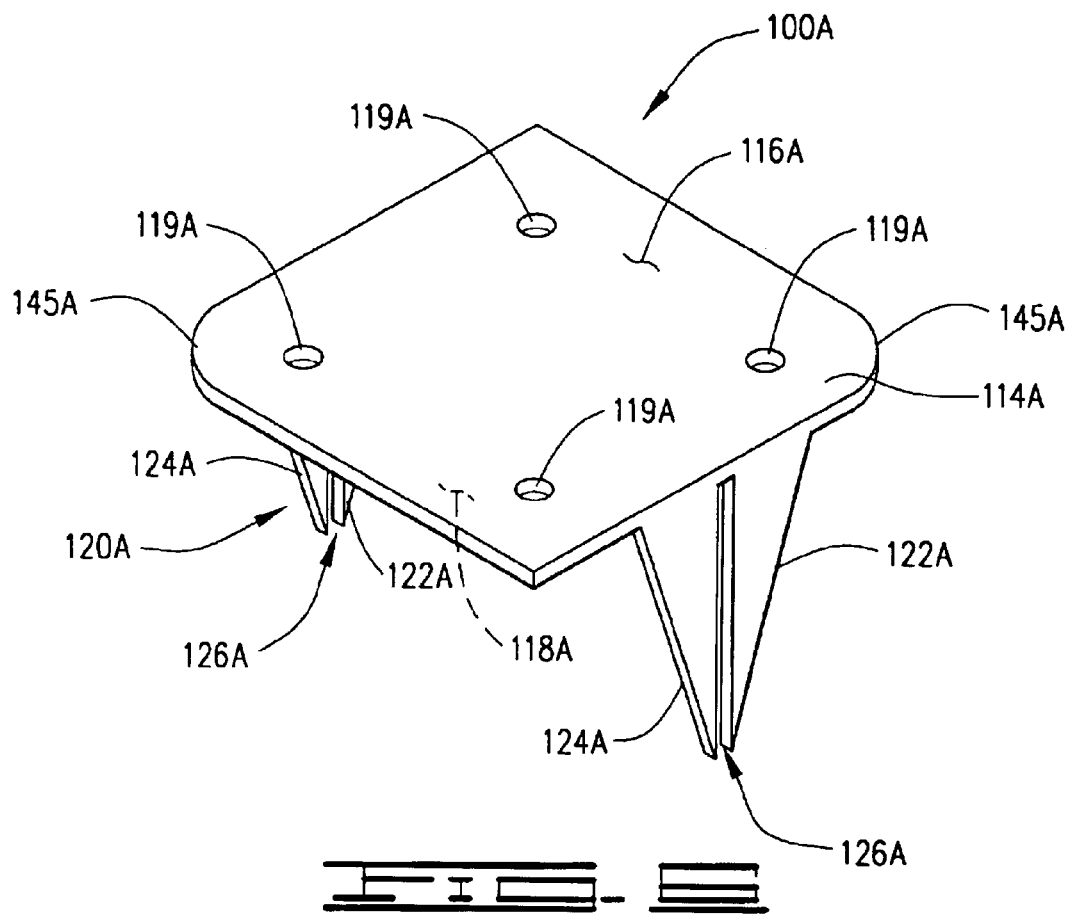
FIG. 6 is an isometric view of a deflection clip constructed in accordance with an alternative embodiment of the present invention.
Figure 7:
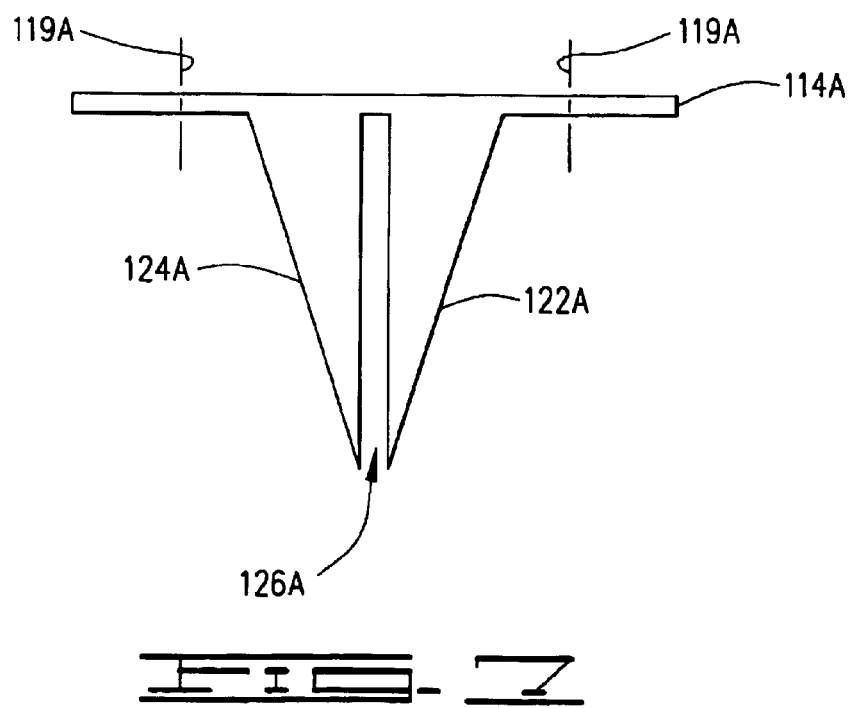
FIG. 7 is an elevational view of the deflection clip of FIG. 6.

FIG. 6 is an isometric view of a clip 100A constructed in accordance with an alternative embodiment of the present invention, offering a relatively simpler unitary construction. Although not shown, a skilled artisan will recognize the manner in which the clip 100A and alternative embodiments hereinbelow join structural members in a slip joint similar to that shown in FIG. 1 and described hereinabove. The clip 100A has a base 114A comprising a first surface 116A and an opposing second surface 118A. The clip 100A further comprises a guide 120A depending from the base 114A, the guide 120A comprising a first arm 122A extending along a longitudinal axis substantially transverse to the base plate 114A from a proximal end adjacent the second surface 118A. The guide 120A further comprises a second arm 124A extending away from the base 114A oriented in the same direction as the first arm 122A defining a channel 126A between the arms 122A, 124A. The clip 100A is attachable to the horizontal framing member (not shown but as in FIG. 1) such as by fasteners passing through the apertures 119A in the base 114A. The guide 120A receivingly engages the vertical member (not shown but as in FIG. 1) in a characteristic operative sliding relationship. FIG. 7 is an elevational view of the clip 100A illustrating an advantageous arrangement of offsetting the apertures 119A symmetrically around the channel 126A in order to further minimize the moments acting on the framing members during deflection.

FIG. 8 is an isometric view of a clip 100B constructed in accordance with an alternative embodiment of the present invention, offering an illustrative construction comprising an assembly of discrete components. The clip 100B has a base 114B comprising a first surface 116B and an opposing second surface 118B. The clip 100B further comprises a guide 120B depending from the base 114B, the guide 120B comprising a first arm 122B extending along a longitudinal axis substantially transverse to the base plate 114B from a proximal end adjacent the second surface 118B. The guide 120B further comprises a second arm 124B extending away from the base 114B oriented in the same direction as the first arm 122B defining a channel 126B between the arms 122B, 124B. The clip 100B is attachable to the horizontal framing member (not shown but as in FIG. 1) such as by fasteners passing through the apertures 119B in the base 114B. The guide 120B receivingly engages the vertical member (not shown but as in FIG. 1) in a characteristic operative sliding relationship. FIG. 9 is an elevational view of the clip 100B, illustrating how in the same manner of clip 100A of FIGS. 6 and 7, the apertures 119B can be disposed symmetrically around the channel 126B to minimize moments imparted to the framing members during deflection.

FIG. 10 is an isometric view of a clip 100C constructed in accordance with an alternative embodiment of the present invention, offering a construction permitting the clip 100C to be installed to the medial portion of the vertical framing member (not shown but as in FIG. 1). The clip 100C has a base 114C (partially removed for clarity) comprising a first surface 116C and an opposing second surface 118C. The clip 100C further comprises a guide 120C depending from the base 114C, the guide 120C comprising a first arm 122C extending along a longitudinal axis substantially transverse to the base plate 114C from a proximal end adjacent the second surface 118C. The guide 120C further comprises a second arm 124C extending away from the base 114C oriented in the same direction as the first arm 122C defining a channel 126C between the arms 122C, 124C. The clip 100C is attachable to the horizontal framing member (not shown but as in FIG. 1) such as by fasteners passing through the apertures 119C in the base 114C. The guide 120C receivingly engages the vertical member (not shown but as in FIG. 1) in a characteristic operative sliding relationship. Unlike the previous embodiments, however, the arm 122C is operatively slidingly engageable against the second member web (not shown) and the arms 124C are operatively slidingly engageable against the second member flanges (not shown but as in FIG. 1).

Figure 12:
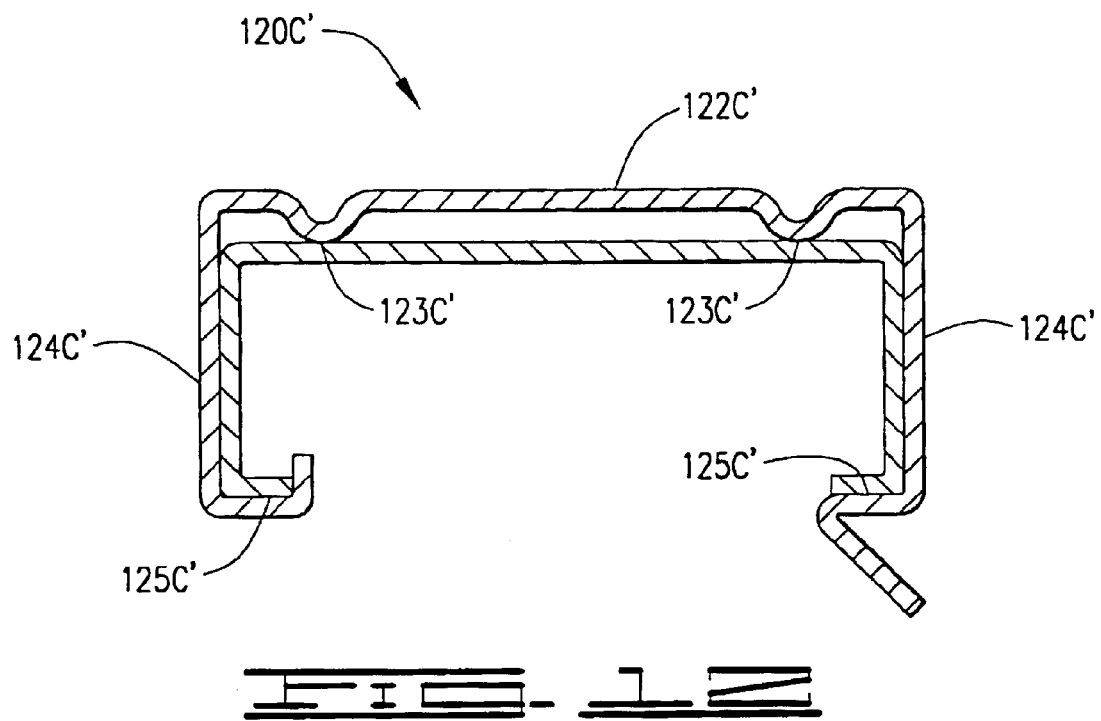
FIG. 12 is a view similar to FIG. 11 but of a deflection clip constructed in accordance with an alternative embodiment of the present invention.

FIG. 11 is a cross sectional view of the clip 100C guide portion 120C slidingly engaging the vertical member web 128. The first arm 122C can be shaped to narrow the gap 126C so as to compressingly engage against the web 128 to provide a desired frictional resistance to the characteristic sliding engagement. For example, the first arm 122C of FIG. 11 has an angled portion 140 and an angled portion 142 extending outwardly from the bearing surface 123C to the arms 124C. Alternatively, the guide 120C' of FIG. 12 has a first arm 122C' defining more than one bearing surface 123C', in opposition to the bearing surfaces 125C of the opposing arms 124C'. In both cases it will be noted that the lengths of the arms 124C are substantially longer than the flanges 130 they fit over. This permits use of a particular clip 100C with a number of studs 104 which might vary in size due to manufacturing tolerances. This can also advantageously permit use of a particular clip 100C with different types of studs 104, such as with both a drywall stud and a structural stud.

Figure 13:
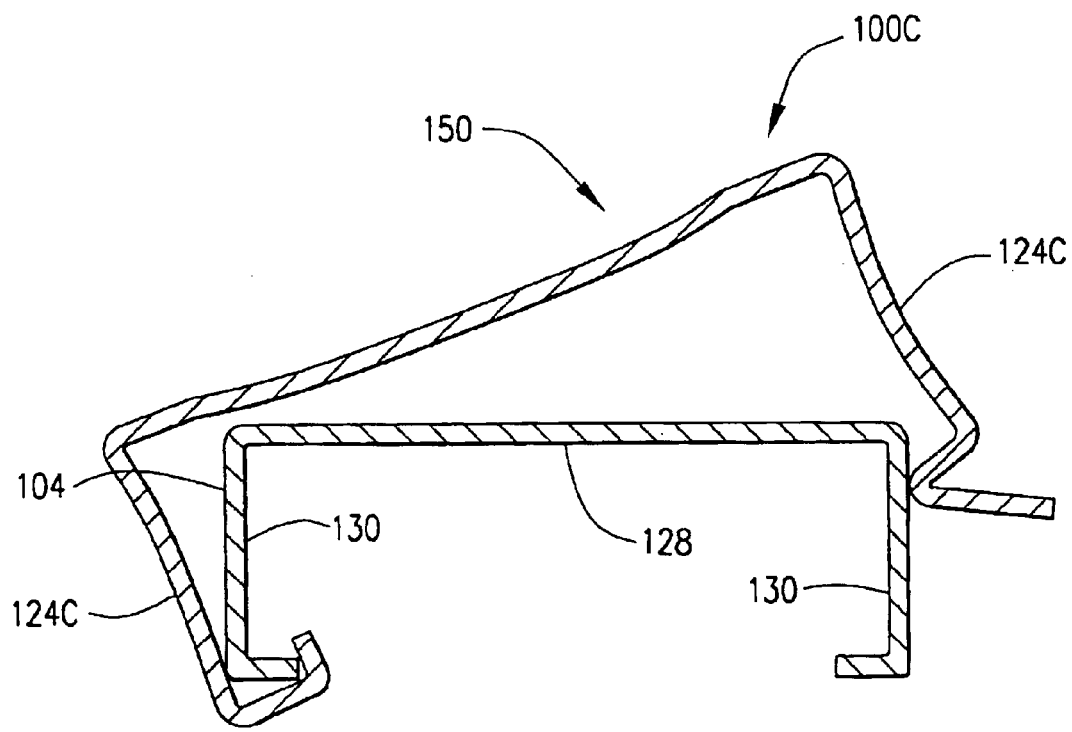

FIGS. 13 and 14 illustrate an advantageous method of attaching the clip 100C to the vertical member 104. In FIG. 13 one of the second arms 124C is engaged with the respective flange 130 of the second member 104. The clip 100C is then rotated in direction 150 until the opposing second arm 124C snaps over the respective flange 130 as shown in FIG. 14. This permits the clip 100C to be attached to the second member 104 without having to be slid on over the end of the second member 104. Thus, the clip 100C can be added to the vertical framing member of an existing wall framing assembly without removing the horizontal framing member first.

Figure 15:
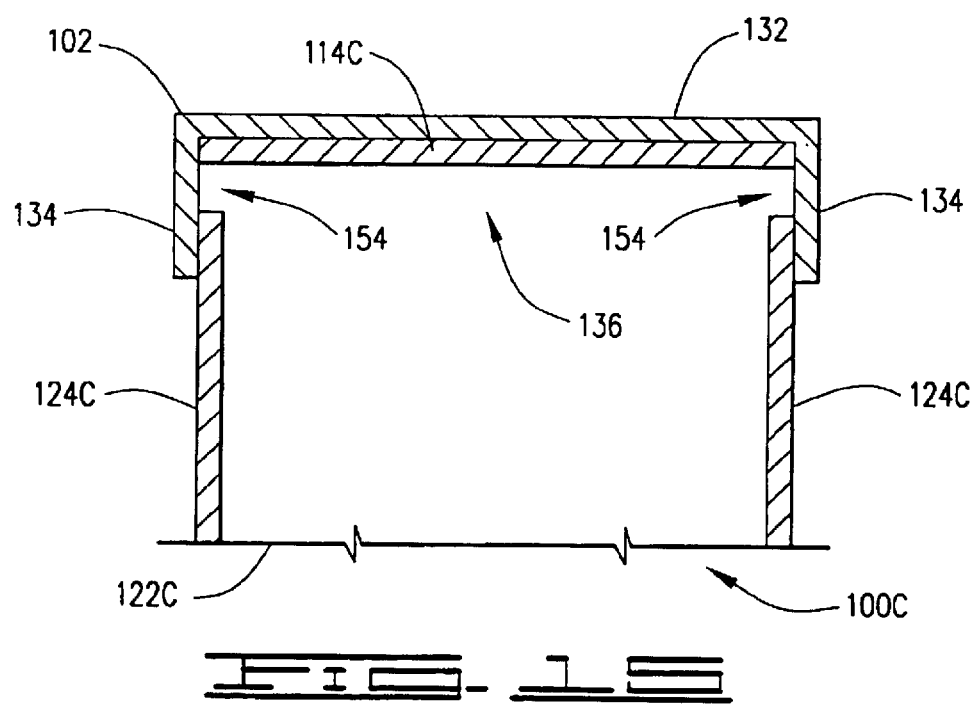
FIG. 15 is a cross sectional view similar to FIG. 5 but of the deflection clip of FIG. 10 attached at the fixed end to the horizontal framing member.

FIG. 15 is a cross sectional view similar to FIG. 5, illustrating the advantage of defining a clearance notch 154 between the second arms 124C and the base 114C. This permits flexing of the second arms 124C during installation of the clip 100C to the second member 104, to prevent binding between the members in the slip joint. This also provides a clearance relief for the second arms 124C in the inside corners of the horizontal framing member to facilitate the nesting attachment of the base 114C within the cavity 136. Preferably, the longitudinal length of the notch 154 is less than the length of the flanges 134, so that the clip 100C is laterally supported by the top member 102 as described above. This permits use of the clip 100C in short leg (shallow) track without disengaging the arm 124C from the support associated with being within the cavity 136. In effect, this permits the conversion of short leg track into the equivalent of deep leg track for deflection purposes.

FIG. 16 is a diagrammatic isometric illustration of a wall framing assembly comprising the first member 102, or first track, and a third member 156, or second track, substantially aligned and spatially disposed from the first track 102. A plurality of second members 104, or studs (only two shown), are interposed between the tracks 102, 156, each stud 104 comprising a longitudinal extending medial web portion 128 and one or more longitudinal stiffening flanges 130 between a first end and a second end of the stud 104.

The clip 100 operatively connects a selected stud's first end to the first track 102 in a slip joint. Another clip 100 can operatively connect the selected stud's second end to the second track 156 as well. Alternatively, a fastener 158 can be used in a conventional manner to attach the stud 104 second end to the second track 156.

Also associated with FIG. 16 is a novel method of framing a wall assembly, comprising providing the first track 102 and providing the second track 156 substantially aligned and spatially disposed from the first track 102. Furthermore, a method includes providing a plurality of studs 104 interposed between the tracks 102, 156, each stud 104 characterized by a longitudinal extending medial web portion 128 and one or more longitudinal stiffening flanges 130 between the ends of stud 104. A method of the present invention further comprises providing the clip 100 for operatively connecting a selected stud's first end to the first track, the clip comprising a base connected to the first track and a guide depending from the base comprising opposing engaging surfaces defining a channel receivingly engaging a portion of the selected stud's web in a characteristic operative sliding relationship. A method of the present invention further comprises engaging the selected stud's first end with the clip 100, connecting the clip 100 to the first track 102 with a fastener, and connecting the selected stud's second end to the second track 156 with a fastener.

Figure 17:
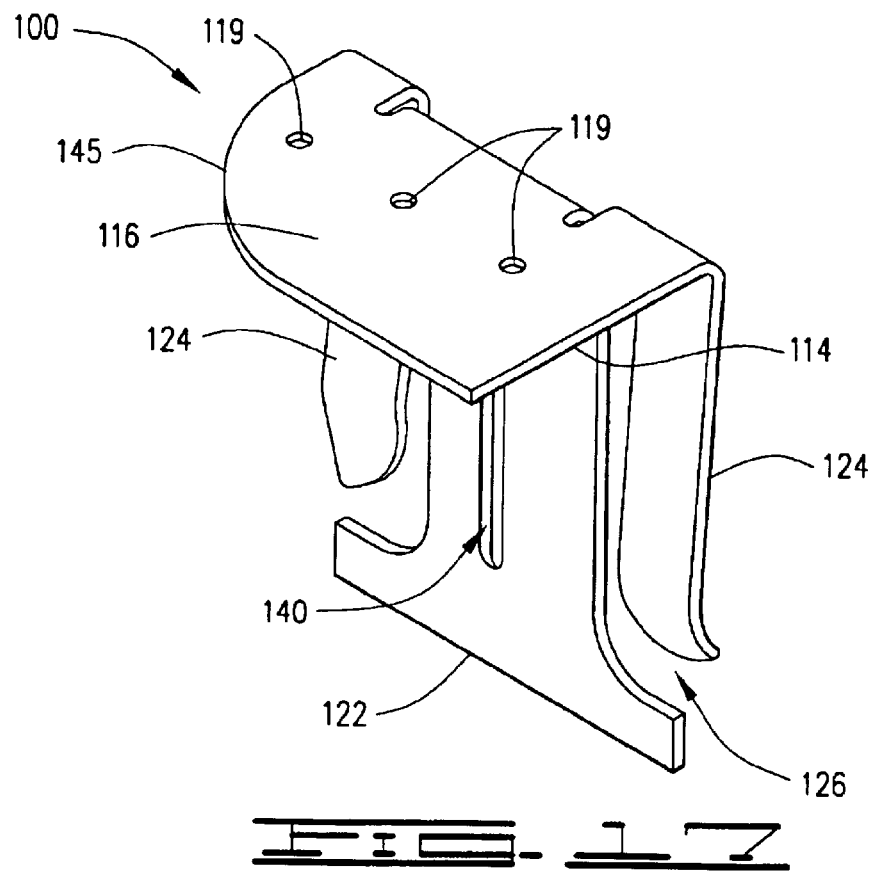
FIGS. 17 and 18 are isometric and elevational views, respectively, of a clip constructed in accordance with an embodiment of the present invention substantially similar to the clip of FIG. 1.
Figure 18:
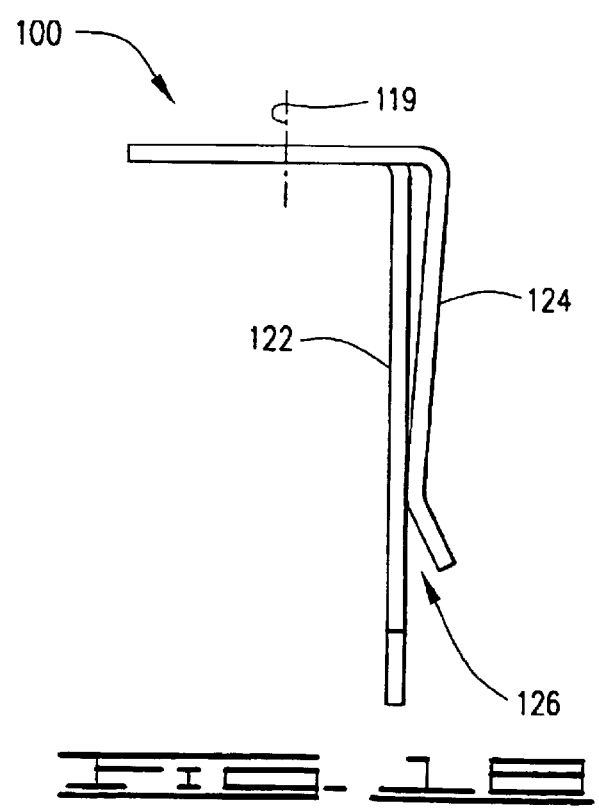

FIGS. 17 and 18 are isometric and side views, respectively, of a clip 100 constructed substantially similar to the clip 100 of FIG. 1 such that like features retain like reference numbers. It will be noted, however, that whereas the opposing arms 122, 124 have outwardly curving distal end portions in the clip 100 of FIG. 1, contrarily the arm 122 in the clip 100 of FIG. 17 is substantially straight at the distal end. The opposing arm 124 in FIG. 18 is curved at the distal end to facilitate placement of the web 128 (not shown) into the gap 126.

It is clear that the present invention is well adapted to attain the ends and advantages mentioned as well as those inherent therein. While a presently preferred embodiment of the invention has been described for purposes of the disclosure, it will be understood that numerous changes may be made in the construction, operation and arrangement of the various elements, steps and procedures without departing from the spirit and scope of the invention as defined in the following claims.

What is claimed is:

1. A wall framing assembly, comprising:
   a first track;
   a second track substantially aligned and spatially disposed from the first track;
   a plurality of studs interposed between the tracks, each stud comprising a longitudinal extending medial web portion and one or more longitudinal extending stiffening flanges between a first end and a second end of the stud;
   a clip operatively connecting a selected stud's first end to the first track in a slip joint, the clip comprising:
      a base fixed to the first track; and
      a guide depending from the base comprising opposing arms defining a channel receivingly engaging the selected stud's web in a characteristic operative sliding relationship; and
   a fastener connecting the selected stud's second end to the second track.

2. The wall assembly of claim 1 wherein the base has a planar first surface and an opposing second surface, and wherein the guide opposing arms comprise a first arm extending along a longitudinal axis substantially transverse to the base from a proximal end adjacent the second surface, and a second arm extending away from the base oriented substantially in the same direction as the first arm.

3. The wall assembly of claim 1 wherein the arms are selectively spatially disposed to operatively engage the second member web with a selected frictional resistance to the operative sliding engagement.

4. The wall assembly of claim 1 wherein the guide defines a slotted opening in at least one of the arms extending substantially along a longitudinal axis of the stud.

5. The wall assembly of claim 1 wherein both of the arms are engageable against the web.

6. A wall framing assembly, comprising:
   a first track;
   a second track substantially aligned and spatially disposed from the first track;
   a plurality of studs interposed between the tracks, each stud comprising a longitudinal extending medial web portion and one or more longitudinal extending stiffening flanges between a first end and a second end of the stud;
   a clip operatively connecting a selected stud's first end to the first track in a slip joint, the clip comprising:
      a base fixed to the first track and
      a guide depending from the base comprising opposing arms, at least one of the arms compressingly engaging the selected stud's web in a characteristic operative sliding relationship; and
   a fastener connecting the selected stud's second end to the second track.

7. The wall assembly of claim 6 wherein the base has a planar first surface and an opposing second surface, and wherein the guide opposing arms comprise a first arm extending along a longitudinal axis substantially transverse to the base from a proximal end adjacent the second surface, and a second arm extending away from the base oriented substantially in the same direction as the first arm.

8. The wall assembly of claim 6 wherein the guide defines a slotted opening in at least one of the arms extending substantially along a longitudinal axis of the stud.

9. The wall assembly of claim 6 wherein both of the arms compressingly engage against the web.

10. A method of framing a wall structure, comprising:
    providing a first track;
    providing a second track substantially aligned and spatially disposed from the first track;
    providing a plurality of studs interposed between the tracks, each stud characterized by a longitudinal extending medial web portion and one or more longitudinal extending stiffening flanges between ends of the stud;
    providing a clip for operatively connecting a selected stud's first end to the first track in a slip joint, the clip comprising:
       a base fixable to the first track; and
       a guide depending from the base comprising opposing arms defining a channel receivingly engageable with the selected stud's web in a characteristic operative sliding relationship;
    engaging the selected stud's first end with the clip;
    connecting the clip to the first track with a fastener; and
    connecting the selected stud's second end to the second track with a fastener.

11. A method of framing a wall structure, comprising:
    providing a first track;
    providing a second track substantially aligned and spatially disposed from the first track;
    providing a plurality of studs interposed between the tracks, each stud characterized by a longitudinal extending medial web portion and one or more longitudinal extending stiffening flanges between ends of the stud;
    providing a clip for operatively connecting a selected stud's first end to the first track in a slip joint, the clip comprising:
       a base fixable to the first track; and
       a guide depending from the base comprising opposing arms, at least one of the arms compressingly engageable with the selected stud's web in a characteristic operative sliding relationship;
    engaging the selected stud's first end with the clip;
    connecting the clip to the first track with a fastener; and
    connecting the selected stud's second end to the second track with a fastener.

12. A deflection clip for joining a first longitudinal member transversely to a second longitudinal member in a slip joint for operatively permitting displacement between the joined members along the operative disposition of the second member longitudinal axis, the first member comprising a planar medial web adjacent one or more transverse flanges and the second member comprising a medial web and one or more outer flanges, the clip comprising:
    a base comprising a first surface and an opposing second surface, the first surface consisting of a planar surface adapted for parallel mating engagement with the first member web, the base operably fixable to the first member web to maintain the parallel mating engagement relationship of the base first surface and the first member web; and a guide depending from the base operatively slidingly constraining the second member web during displacement between the joined members along the operative disposition of the second member longitudinal axis, the guide comprising:

a first arm extending substantially transverse to the base from a proximal end adjacent the base second surface and comprising a bearing surface adapted to slidingly engage the second member during the displacement between the members; and a second arm extending from the base oriented substantially in the same direction as the first arm, the second arm comprising a bearing surface adapted to slidingly engage the second member during the displacement between the members, the arms being noncoplanar and spaced apart in a direction transverse to the operative disposition of the second member longitudinal axis and with a selected spacing in relation to the characteristic arrangement of the second member to adaptively permit freedom of movement between the guide and the second member during the displacement between the members along the operative disposition of the second member longitudinal axis.

13. A deflection clip for joining a first member and a second member in a slip joint, the clip comprising:

a planar base plate fixable to the first member; and a guide depending from the base plate comprising:

a first arm extending along a longitudinal axis substantially transverse to the base plate; and a second arm extending from the base plate oriented substantially in the same direction as the first arm defining a channel interposed laterally between the arms, the arms being noncoplanar and spaced apart with a selected spacing in relation to the second member to adaptively engage the second member permitting freedom of movement between the guide and the second member during displacement between the members.

14. The clip of claim 13 wherein the arms are selectively spatially disposed to adaptively engage the second member with a selected frictional resistance to the displacement.

15. The clip of claim 13 wherein the guide defines an opening in at least one of the arms adapted for admitting a retainer limiting displacement of the guide relative to the second member when an edge of the opening pressingly engages against the retainer.

16. The clip of claim 15 wherein the opening comprises a slotted opening adapted to extend substantially along a longitudinal axis of the second member.

17. A The clip of claim 15 wherein the guide further comprises an indicia adaptively indicating a nominal position of the retainer.

18. A The clip of claim 13 wherein the first member comprises a medial web and opposing flanges defining a cavity, wherein the base plate is adapted to substantially laterally span the cavity.

19. The clip of claim 13 comprising a unitary construction.

20. The clip of claim 13 wherein the base plate is fixable to the first member by a fastener imparting an attachment force acting substantially parallel with the arms.

\* \* \* \* \*

UNITED STATES PATENT AND TRADEMARK OFFICE
CERTIFICATE OF CORRECTION

| | |
|---|---|
| PATENT NO. | : 6,792,733 B2 |
| APPLICATION NO. | : 09/978477 |
| DATED | : September 21, 2004 |
| INVENTOR(S) | : Frank Wheeler et al. |

It is certified that error appears in the above-identified patent and that said Letters Patent is hereby corrected as shown below:

On title page, item 56 References Cited
 replace "3,730,486 A"
 with --3,730,466 --.

Signed and Sealed this

Twenty-seventh Day of February, 2007

JON W. DUDAS
*Director of the United States Patent and Trademark Office*